United States Patent [19]

Karamon et al.

[11] Patent Number: 4,839,733

[45] Date of Patent: Jun. 13, 1989

[54] METHOD AND SYSTEM FOR SYNCHRONIZATION OF AN AUXILIARY SOUND SOURCE TO MOTION PICTURE FILM, VIDEO TAPE, OR OTHER PICTURE SOURCE CONTAINING A SOUND TRACK

[76] Inventors: John J. Karamon, 19 Berkeley St., Stamford, Conn. 06902; Daniel W. Gravereaux, 602 Carter St., New Canaan, Conn. 06840

[21] Appl. No.: 132,295

[22] Filed: Dec. 15, 1987

[51] Int. Cl.$^4$ ............................................... H04N 5/76
[52] U.S. Cl. .................................... 358/341; 360/13; 360/61; 369/70
[58] Field of Search ................... 358/311, 335, 341; 360/12, 14.1, 14.3, 15, 31, 79, 80, 61, 38.1, 33.1, 26; 369/54, 58, 70, 43, 44, 83, 84, 85; 352/31, 131

[56] References Cited

U.S. PATENT DOCUMENTS

| | | | |
|---|---|---|---|
| 2,693,127 | 11/1954 | Ortman | 88/12.2 |
| 2,774,056 | 12/1956 | Stafford et al. | 360/31 |
| 2,925,753 | 2/1960 | Schwartz et al. | 88/28 X |
| 3,051,042 | 8/1962 | Maurer | 88/24 X |
| 3,492,068 | 1/1970 | Baron | 352/12 X |
| 3,498,702 | 3/1970 | Meninger et al. | 352/12 |
| 3,620,609 | 11/1971 | John, Jr. | 352/17 X |
| 3,664,735 | 5/1972 | Metzger | 352/24 X |
| 3,826,566 | 7/1974 | Csontos | 352/12 X |
| 3,832,045 | 8/1974 | Wilson et al. | 352/25 |
| 3,900,251 | 8/1975 | Doyle et al. | 352/12 X |
| 3,932,032 | 1/1976 | Weinstein | 352/11 |
| 3,979,774 | 9/1976 | Chen et al. | 360/80 |
| 4,027,958 | 6/1977 | Shigeta et al. | 353/26 A |
| 4,067,049 | 1/1978 | Kelly et al. | 360/13 |
| 4,075,668 | 2/1978 | Keach | 360/80 |
| 4,204,751 | 5/1980 | Game et al. | 352/12 X |
| 4,410,970 | 10/1983 | Law | 369/58 |
| 4,461,552 | 7/1984 | Levine | 352/27 |
| 4,468,710 | 8/1984 | Hashimoto et al. | 360/9.1 |
| 4,547,816 | 10/1985 | Sochor | 360/19.1 |
| 4,575,772 | 3/1986 | Shimada et al. | 360/19.1 |
| 4,598,324 | 7/1986 | Efron et al. | 358/341 |
| 4,600,280 | 7/1986 | Clark | 352/37 |
| 4,757,540 | 7/1988 | Davis | 369/83 |
| 4,758,908 | 7/1988 | James | 360/61 |

Primary Examiner—Donald McElheny, Jr.
Attorney, Agent, or Firm—Parmelee, Bollinger & Bramblett

[57] ABSTRACT

A method and system for synchronizing a digital signal of an audio message at higher quality with another signal of the same audio message at lower quality. The invention synchronizes an auxiliary high quality audio digital sound signal source with the ordinary quality analog sound signal coming from a conventional analog sound track on motion picture film as the motion picture is being shown and maintains effective synchronization in spite of missing segments of the sound track due to film splices. The invention does not require synchronization tracks, markers, codes, time codes or other extrinsic data. The only requirement is that the higher qualtiy audio message recording, e.g. in a digital medium, be made from the same "master recording" (or a high quality duplicate thereof) as the sound track so that the auxiliary recording have the same informational content as the sound track. In order to maintain synchronization of the high quality audio message in spite of missing segments of the lower quality audio message, the higher quality message is caused to precede the lower quality message, and is temporarily stored in time-delay means, such as a FIFO overwriting memory store. Correlation is achieved by re-iterative subtractions between digital numbers representative of characteristics of the absolute value envelope of the ordinary quality message signal and digital numbers representative of characteristics of the absolute value envelope of the high quality message. When the missing segments of the cinema sound track amount to more than the time-delay storage capability of the time-delay means, the system immediately smoothly "fades" over to utilize the conventional analog sound track of the cinema film for uninterrupted sound accompanying the motion picture being viewed by the theater audience. Re-synchronism is quickly achieved, and the system immediately automatically smoothly "fades" back to the higher quality sound.

60 Claims, 6 Drawing Sheets

METHOD AND SYSTEM FOR SYNCHRONIZATION OF AN AUXILIARY SOUND SOURCE TO MOTION PICTURE FILM, VIDEO TAPE, OR OTHER PICTURE SOURCE CONTAINING A SOUND TRACK

FIELD OF THE INVENTION

The present invention is in the field of sound synchronization, and more particularly this invention relates to a method and system for the synchronizing of a higher quality sound source with another sound source of the same information content. This method and system are typified by an auxiliary digital sound source being synchronized, i.e. locked in time, to an analog sound track of a cinema film as the motion picture is being shown, or are typified by such an auxiliary digital sound source being synchronized to a conventional audio portion of a video tape as the video tape program is being viewed.

BACKGROUND

At the present time, for the case of motion pictures, there are various techniques being used to permit the use of auxiliary (digital) audio sound sources for motion pictures. They require the preparation of a special film print which contains a unique marker code in place of the standard optical audio track. This special release print film, along with the digital audio recording and special playback equipment, is supplied to theaters for digital playback. Theaters with regular projectors must receive the standard film instead and cannot utilize the higher quality digital audio sound sources.

One reason why a unique marker code is required (rather than merely using the passage of time for synchronization) is that the motion picture film itself during its repeated handling and showing is subject to breakage and consequent film splicing. When the film is spliced, one or more frames of the film become lost at the splice depending upon whether the breakage was straight across the film or was a diagonal tear extending obliquely through more than one frame of the motion picture. This loss of one or more frames causes the motion picture and the sound track on the film to become shortened in physicial length. Thus, there is a sudden forward "jump" in the motion picture which momentarily loses synchronism with the sound track when the splice passes through the motion picture projector aperture. The synchronism is regained when the splice passes through the sound transducer. This momentary loss of synchronism is due to the physical film path distance between the projector aperture and the sound transducer as is conventional in motion picture projectors. The sound track is conventionally offset along the length of the film from the specific frames to which the sound track relates by an "offset distance" equal to the length of the normal film path distance in a projector between the optical aperture and the sound track transducer. The method and system of the present invention do not remove that momentary loss of synchronism caused by the interaction of a film splice with the physical film path distance between the optical aperture and the sound transducer.

There are other reasons why a marker code is used on the motion picture film for synchronization of an auxiliary sound source with the film. These other reasons include start-up, unexpected stoppage due to variety of possible causes and speed creepage of either the motion picture projector or of the auxiliary sound source.

In the case of video tape, there are many synchronizing systems available which use spacial marker coding systems. However, there is no method available for use with home type video cassettes.

With the continual development of improved consumer audio media, such as the compact disc (CD) and digital audio tape (R-DAT), and the marketing of audio processing systems for use with VCRs, the home viewer is seeking better quality sound, and the home viewer would like to enjoy this better quality sound with video viewing. This invention has direct application to this field of better quality sound to accompany video media.

In the case of editing video tape and film in post production, there are many synchronizing systems presently in use. However, there are numerous instances wherein a final or work print of a film or video production is made without synchronizing markers or codes. Additional editing, or remaking a better quality master, in which the various sources are synchronized to the work print, can be advantageously carried out by employing the invention.

SUMMARY

The method and system embodying the present invention keep an auxiliary sound source (generally the higher quality sound such as from a digital tape player) synchronized, i.e. locked in time, with the sound track on a motion picture film as the film is being projected, or with the video tape or program as it is being viewed. Thus the visual information is shown in conjunction with the auxiliary, generally higher quality, audio (which is in perfect synchronism with the picture).

The method and system of this invention are novel inasmuch as they do not utilize nor require synchronizing tracks, markers, codes, time codes, or other extrinsic (extra) data to be recorded on either the film or video tape, or the auxiliary sound medium, as do all previous methods. The invention utilizes the standard sound track as the source of synchronization.

For employing the invention it is a requirement that the high quality and ordinary quality sound recordings both contain the same audio message, i.e. that they both be made from the completely edited original source. For example, this completely edited original source is a "master recording" or is a high quality duplicate of the master recording. Then, the motion picture film's analog optical sound track or the video tape's audio track (or whatever ordinary sound track for accompanying a moving image) is made from this master recording. The high quality auxiliary sound medium is also made from the master recording, or from a high quality duplicate of the master recording, so that the ordinary sound track and the high quality auxiliary sound playback medium contain the same audio message. In other words, the present invention advantageously utilizes the intrinsic (inherent) information within the audio message itself to achieve synchronization of the high quality sound signal to the ordinary sound.

The invention herein advanageously utilizes the standard film which contains the optical sound track, or the video tape that contains the magnetic audio track, respectively. An auxiliary, higher quality recording of the same master is played back. The standard audio itself, from the film or video tape, provides the information that controls the timing of the higher quality auxiliary sound source. The auxiliary audio becomes locked to the film's or video tape's sound track and, therefore, is kept in essentially perfect synchronism with the picture.

This novel synchronizing method and system offer two major advantages over all other methods and systems. First, only a standard motion picture theater release print, or standard video tape, needs to be prepared and distributed for viewing. This single-inventory concept has obvious economic advantages over making a variety of release print types to bring digital audio to the movie audience. The same economic advantage applies to the video tape retail market. Secondly, the conventional sound track on the film or tape is redundant to the auxiliary, higher quality sound track and is always available to be used as the fall-back mode in case the higher quality, digital sound encounters difficulty.

The synchronization method and system of this invention handle diverse situations of start-up, stop, a film or tape splice, and speed creep in either the film, tape, or the auxiliary medium. The most difficult situation is that of the film or tape splice. Many frames may be missing due to the film breakage and repair. Also in the case of motion picture film, it passes through many hands wherein frames are sometimes removed by hobbyists collecting film segments. During film viewing, the motion picture image and the audio sequentially jump ahead at the splice. At a break or splice, the synchronization method and system of this invention immediately and automatically causes a cross fade of the auxiliary audio to the standard track on the film print or video track to continue the show. Also, there immediately occurs a shift into a "search mode" seeking to re-align synchronism of the auxiliary sound with the on-going standard sound. As soon as synchronizm is achieved, there is another cross fade to return the audio playback to the auxiliary, higher quality sound track.

In summary, the synchronization method and system of the invention, upon a break or splice, enable automatic cross fades to the standard audio track on the film print or video for continuing the show. Concurrent with the preceding event, there is a shift into a search mode seeking to synchronize the auxiliary sound track to the on-going standard sound track of the picture. When the auxiliary audio and the picture conform again in synchronism, there is a reverse cross fade from the standard film or video sound track back to the higher quality auxiliary sound track.

Film creep relates to the normal or usual tendency for small differences to occur in reproduced speed between the playback of the standard sound and the running of the higher quality auxiliary sound source. The synchronization method and system of the invention prevent any such creeping differences in timing from occurring and also deal with the problem of controlling the operation of the player of the higher quality sound source.

BRIEF DESCRIPTION OF THE DRAWINGS

The various features, aspects, objects and advantages of the present invention will become more fully understood from the following detailed description and the accompanying drawings, in which like reference numbers refer to the same elements or components or signals throughout the various Figures, in which.

DETAILED DESCRIPTION OF PRESENTLY PREFERRED EMBODIMENTS

The following detailed description makes use of block diagrams, and various components are explained in terms of their functional operation. It is to be understood that these components can be implemented in various ways, using either analog or digital techniques as will become understood by those skilled in the art in reading the following description with reference to the accompanying drawings.

Figure 1:
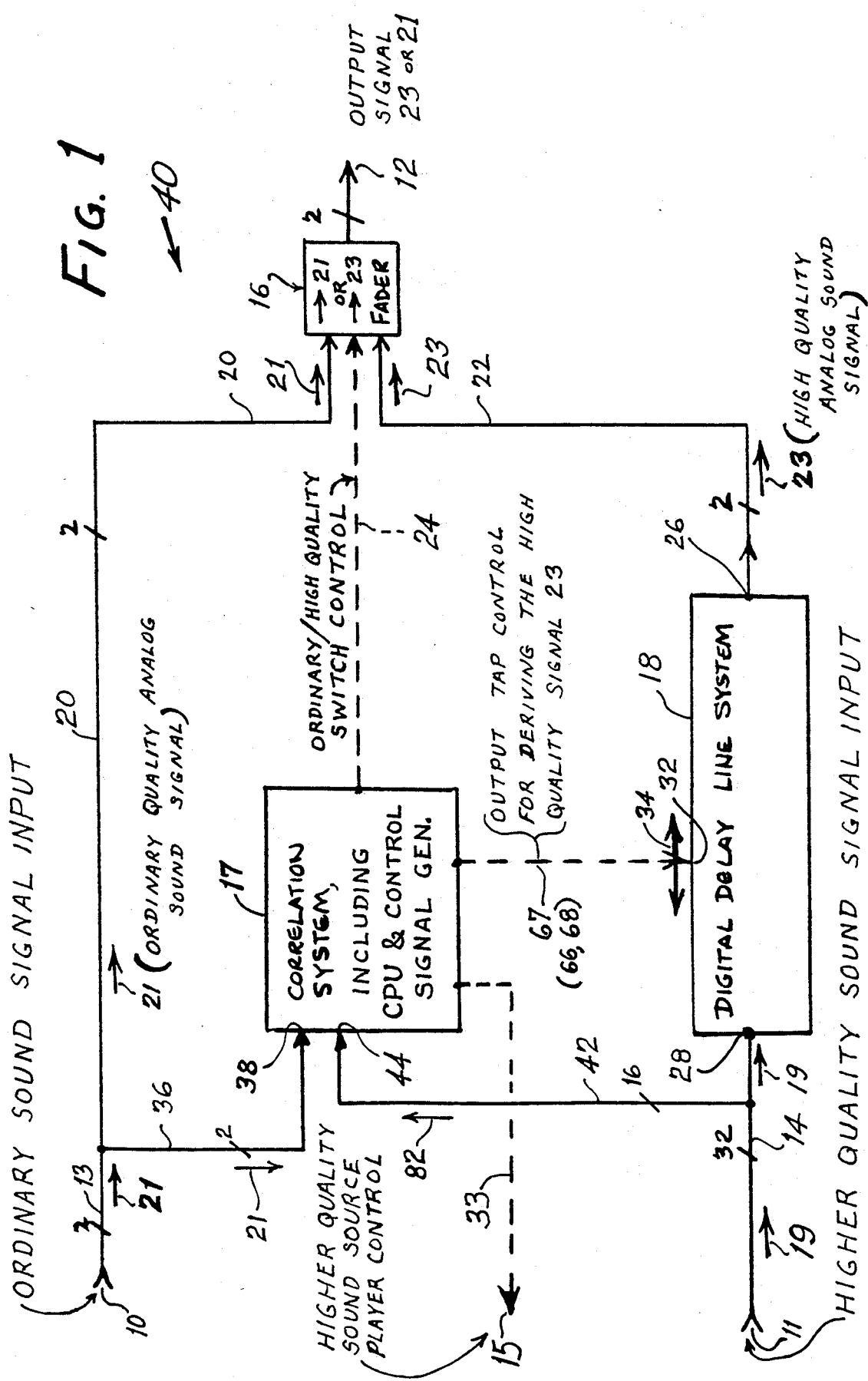
FIG. 1 is a functional block diagram of a method and system embodying the present invention for synchronizing an auxiliary sound source of higher quality to a motion picture film, video tape or other moving picture source containing a conventional sound track of ordinary quality.

Attention is invited to FIG. 1 which serves to explain the principles of operation and functional steps employed in one method and system embodying the present invention. There are two input ports or terminals 10 and 11. The first input port 10 receives a signal from the standard or ordinary sound track normally accompanying the visual media. In many cases this first input port 10 will be receiving an ordinary analog signal being transmitted over a two-line audio connection 13, for example this analog signal is originating from the sound track on a cinema film or from a sound track on the audio portion of a video tape. This analog input signal at the ordinary sound signal input port 10 comes from the film's stereo sound output and is the audio voltage that normally would go to the theater's sound system. The number 2 on this line 13 indicates a two-line or two channel connection.

Although the illustrative method and apparatus embodying the invention is shown handling a two-line or two-channel stereo input signal 21, it is to be understood that the invention is not limited to the handling of two-channel stereo. The method and system of this invention also can be applied to advantage for handling monaural sound signals and also for handling multi-channel "surround" stereo system sound, which may involve 4-channels or 6-channels, etc.

The second input port or terminal 11 serves to receive the higher quality sound signal, which corresponds with the ordinary sound signal. For example, this higher quality sound signal is a digital signal coming from a auxiliary digital sound storage system (not shown). As explained in the SUMMARY above, the one requirement for employing this invention is that this higher quality auxiliary sound source need have been made (recorded) from the original same sound master as the ordinary sound signal recording. This auxiliary higher quality sound signal source (not shown) does not form part of the present invention. The auxiliary storage system may be any one of many high quality sound playback systems, such as a compact disc (CD), rotary digital audio tape (R-DAT), video cassette adapter system (Sony model F-1 or PCM-1630 series), or one of the digital audio stationary head machines (DASH). The input line 14 from the higher quality input port 11 is indicated by the number 32 to be a thirty-two line digital audio signal transmission buss representing, say, two channels of 16 bit parallel audio lines.

The method and system shown in FIG. 1 has a single audio signal output port or terminal 12, for example a two-line stereo audio output terminal. This output terminal 12 provides the audio voltage that drives the theater's sound system. The intent is that this audio output voltage at terminal 12 will come from the higher quality digital sound signal input, whenever digital program material is present, or whenever a transition is not occurring. If there is no higher quality sound signal source, then the output at terminal 12 will contain the conventional ordinary sound signal being received at the input port 10.

There is also a control terminal 15 which serves to control both the rate of the higher quality audio digital information being received at the second input terminal 11 and also controls the speed of the playback mechanism of the high quality sound source.

FIG. 1 shows three major functional blocks: a fader 16, a correlation system 17, and a delay line system 18. Although each functional block 16, 17 and 18 will be discussed in detail in later sections, it is helpful to the reader to provide first an overview of their respective functions.

PRELIMINARY DESCRIPTION OF THE FADER

The fader 16 switches between the conventional or ordinary audio signal supplied via a connection 20 and the higher quality sound signal on a connection 22 from the delay system 18. This fader is controlled by proper commands from the correlation system 17, and these command signals are provided to the fader 16 from the correlation system 17 as indicated by the dashed line (control function path) 24.

However, this fader 16 is not an ordinary switch; it is a cross fade device, which is similar in concept to a "dissolve" for slide projectors. If the command is given to switch from, say, ordinary input on line 20 to higher quality input on line 22 then the ordinary sound signal would be attenuated over time to reach full off, and the higher quality sound signal sould be augmented from off to full on, over the same time period. This type of fader "switch" produces a benign transient which, for most program material, is inaudible to the audience. In this case, all that would be noticed over time is an improved audio characteristic, due to the higher quality digital playback audio signal on line 22. There is no annoying "pop" due to the switchover.

For providing a practical illustrative example of an application in which the method and system of this invention can be employed to good advantage, this description will now focus upon synchronizing a higher quality auxiliary digital sound signal 19 with an ordinary analog sound signal 21 coming from a cinema film, as the motion picture is being shown in a theater.

PRELIMINARY DESCRIPTION OF THE DELAY LINE

The delay line system 18 may have any desired practical delay. In this example, the digital delay line system 18 handles the sound for up to ten seconds of missing motion picture film frames, and thus it has a ten-second delay capability. In addition, this delay line sysatem 18 must have the same digital word width and the same average sample rate as the digital audio signal 19 which is fed into the input port 11. In this example the high quality sound signal 19 on the thirty-two line buss 14 is characterized by two channels of sixteen-bit words having a sample rate of 48 kiloHertz each.

It is to be noted that this delay-line system 18 determines the maximum range of time synchronization capability, e.g. up to 10 seconds of missing film frames. It is desired that the fidelity or quality of the high quality analog sound signal 23 at the output of 26 be equal to the fidelity or quality of the entering high quality sound signal 19 for providing the full advantages of the present invention. In order to achieve the preservation of quality, it is necessary that the delay-line system 18 have the same (or greater) number of bits per sample as the entering digital sound signal 19. (It is also possible for the delay-line system to have a faster sample rate than the entering digital sound signal 19, providing an appropriate sample rate converter be utilized in conjunction with the input port 28.)

The delay line system 18 is intended to store as long a time-segment of the digital audio signal 19 as permitted by its capacity, e.g. a ten second time-segment. The output end 26 of this delay line system is generally running in exact synchronism with the ordinary audio signal 21. (However, whenever a film splice due to missing film frames has just been encountered; then, the output end 26 will momentarily be running behind exact time synchronization with the ordinary sound signal 21; the fader 16 will be switched over for transmitting the ordinary signal 21 to its output 12; and the delay line system 18 will be operating in a synch-search mode to be explained later.)

It is to be noted that the delay line system output end 26 includes a digital-to-analog converted (DAC) 30 (FIG. 2) for converting the digital signal 19, which has been stored in the delay line into a high quality analog audio signal 23, being fed over a two-line connection 22 to the fader 16.

It is to be understood that this delay line system 16 is filled with digital signals for high quality sound which is LATER IN TIME (emphasis intended) e.g. up to ten seconds later in time, than the instantaneous present time of the ordinary sound signal 21. Whenever a film splice (missing frames) is encountered, then the correlation system 17 advantageously instructs that the high quality analog audio output signal 23 supplied from the output 26 of the delay system be derived from stored digital signals at a later time (towards the input end 28 of this delay line.)

In an advantageous effect on the output the derivation tap 32 is moved ahead (later) in time by being shifted toward the delay line input end 28. In other words, the high quality analog signal 23 must be caused to "jump ahead" in order to regain synchronism with the film sound track signal 21 which has already experienced a jump ahead due to missing film frames. The left/right arrow 34 indicates that the correlation system 17 provides the output tap control 32 for determining the location within the delay line system 13 of the digital signals from which the high quality analog signal 23 is derived.

The input end 28 of the delay line system 18 receives its input signals 19 from the auxiliary digital sound source medium. The momentary rate that the digital samples are received is controlled by the auxiliary digital sound source player control 15. For the missing frame situation described above, the momentary rate of the digital samples is now increased. Since the sample rate of the signals 19 is now momentarily faster than normal, the delay output tap control 32 is caused to move slowly from the jump-ahead position back to the output end 26 of the delay line 18, in order to be available to react for any subsequent missing frames. The digital sound storage medium is then returned to it's nominal rate by the player control 15, when the delay output tap control 32 has again reached the output end of the delay line 18.

When the delay output tap control 32 is at the output end 26 of the delay line system 18, then this illustrative system as described has its normal capacity to maintain almost uninterrupted availability of synchronized high quality analog sound signals 23 up to a ten-second time-segment of missing film frames.

In the event that a 6-second time-segment of missing frames has just been encountered, then the delay tap 32 will quickly be shifted to a point as shown in FIG. 1 which corresponds with 6 seconds from the output end 26 and 4 seconds from the input end 28. In this particular situation, as shown in FIG. 1, the system still retains the capability to maintain almost uninterrupted availability of synchronized high quality analog sound signals 23 up to the occurrence of a 4-second time-segment of missing frames close in time with the 6-second film splice "break" which has just been encountered.

In the event that a film splice "break" longer than 4 seconds is encountered close in time, after the occurrence of a 6-second film splice "break" represented by the showing in FIG. 1, for example assume that a 7-second film splice "break" is now encountered; then the delay control tap 32 is shifted to a position at the very front end 28 of the delay line system 18. When the initial 6-second film splice "break" was encountered, it caused the digital player via line 15 to begin running at a faster rate than normal in order to reset itself to the normal 10-second digital storage. The digital player continues to run at this faster than normal rate when the 7-second "break" is encountered. The sum of a 6-second and then a 7-second film splice "break" is 13 seconds, which is recognized to exceed by, 3 seconds, the 10-second delay storage capability of this particular system 18, i.e. there is a 3-second time segment "gap." Consequently, the availability of synchronized high analog sound signals 23 is "lost" for a short while until this 3-second "gap" can be closed. The theater audience now hears the ordinary analog signal 21 while the "gap" is being closed. The digital player is continuing to run faster than normal, and soon the digital signals 19 arriving at the front end 28 correspond in time with the ordinary signals 21. The 3-second "gap" has now been closed, and the delay tap control 32 causes these appropriately synchronized high quality analog sound signals 23 to appear at the output 28 of the delay line system 18. The fader 16 now shifts over to the high quality sound signals 23. The digital player continues to run faster than normal, while the delay tap control 32 is caused progressively to move (arrow 34) along the delay line system 18 towards the output end 26. When this delay control tap 32 reaches the output end 26, then once again this output end 26 is exactly synchronized in time with the occurrence of the on-going ordinary sound signals 21.

Small corrections in speed are made either by causing the digital player control 15 to slightly adjust the average playback speed of the digital medium or by moving the position (arrow 34) of the delay tap control 32 along the delay line system 18, or a combination of both small corrections can be used. The important point to be understood is that small corrections in timing can be made on an almost continuous basis to keep the digital signal in exact synchronization.

As mentioned previously, it is to ve noted that the number of communication "lines" or each connection (for each buss or communication pathway) is indicated by a numbered slash on the connection. It is to be understood that each communication line has an associated return (or ground) conductor in order to complete the circuit for the communication line. In some instances there is a common return (or common ground) for a plurality of communication lines. For example, in FIG. 1 the output pathway 12 for the signal voltage being fed to the stereo loudspeaker system of the theater has a "2" numbered slash, thereby indicating two communication lines, namely one line for the left side stereo loudspeakers and a second line for the right side stereo loudspeakers. As understood by those skilled in the art, there is also a return conductor (not shown) for each of these two output signal lines, and that returen conductor may comprise a common return at ground potential for both lines.

The whole synchronization system shown in FIG. 1 is generally indicated by the reference number 40.

PRELIMINARY DESCRIPTION OF THE CORRELATION SYSTEM

Inviting attention to the correlation system 17, it is to be understood that this system 17 provides two functions: (a) analysis and comparison of the ordinary quality analog sound signals 21, which are fed in over a two-line path 36 to an input port 39, to a high quality digital sound signal 19, which is fed in on a 16-line path 42 to input terminal 44 of the correlation system 17, and (b) controlling the whole synchronization system 40. The reason for a two-line path 36 is to handle both the left analog stereo signal and the right analog stereo signal.

In the analysis and comparison function, the correlation system 17 is analyzing the envelope of the ordinary quality analog sound signals 21 and is comparing the results of this analysis with the envelope of digital audio signals which are fed over a sixteen-line input buss 42 to a high quality digital sound signal input terminal 44 of the correlation system 17. The reason for using the sixteen-line input buss 42 is to accommodate both left and right digital audio signals as 8-bit parallel words. It is seen in FIG. 1 that the higher quality digital audio signal on input buss 14 comprises 16-bit words for both left and right stereo digital audio, thus requiring a 32-line buss 14. In this present embodiment of the invention the least significant eight bits of both the left and right stereo audio words are not communicated via the sixteen-line input buss, because the correlation system 17 operates with regard to average envelope information and does not require greater precision than provided by the sixteen-line buss 42, as will be explained later. From the comparison of the inputs at terminals 38 and 44, the correlation system 17 determines at each instant the appropriate delay tap 32 of the delay line 18 from which to feed the output 26.

As part of its overall control functions (b) mentioned above, the correlation system 17 determines the appropriate command signals fed to the output 15 for instructing operation of the digital playback medium and also determines the appropriate command signals fed via control path 24 for instructing operation of the fader 16.

This correlation system 17 includes microcomputing elements and performs various internal functions in accordance with algorithms to be explained later.

In this practical implementation of the synchronizer system 40, the correlation system 17 also contains the instructions and sub-routines for starting the film and controlling the higher quality auxiliary digital audio, including starting, stopping, and perhaps rewinding the digital audio medium, and all other control matters pertaining to the system automation. For example, the synchronizing system 40 employs a delay line 18 of, say 10 seconds. Consequently, the digital audio medium will have to start running ten seconds in advance of the cinema film in order to fill the digital delay line 18 before the film starts showing (before the ordinary analog signals 21 start arriving at the input 10). This ten second "head start" for the digital player will thereby fill the ten-second delay line so that the first digital signal output at 26 will exactly correspond with the first ordinary analog signal arriving on the input connector 13.

DIGITAL DELAY LINE SYSTEM 18

Figure 2:
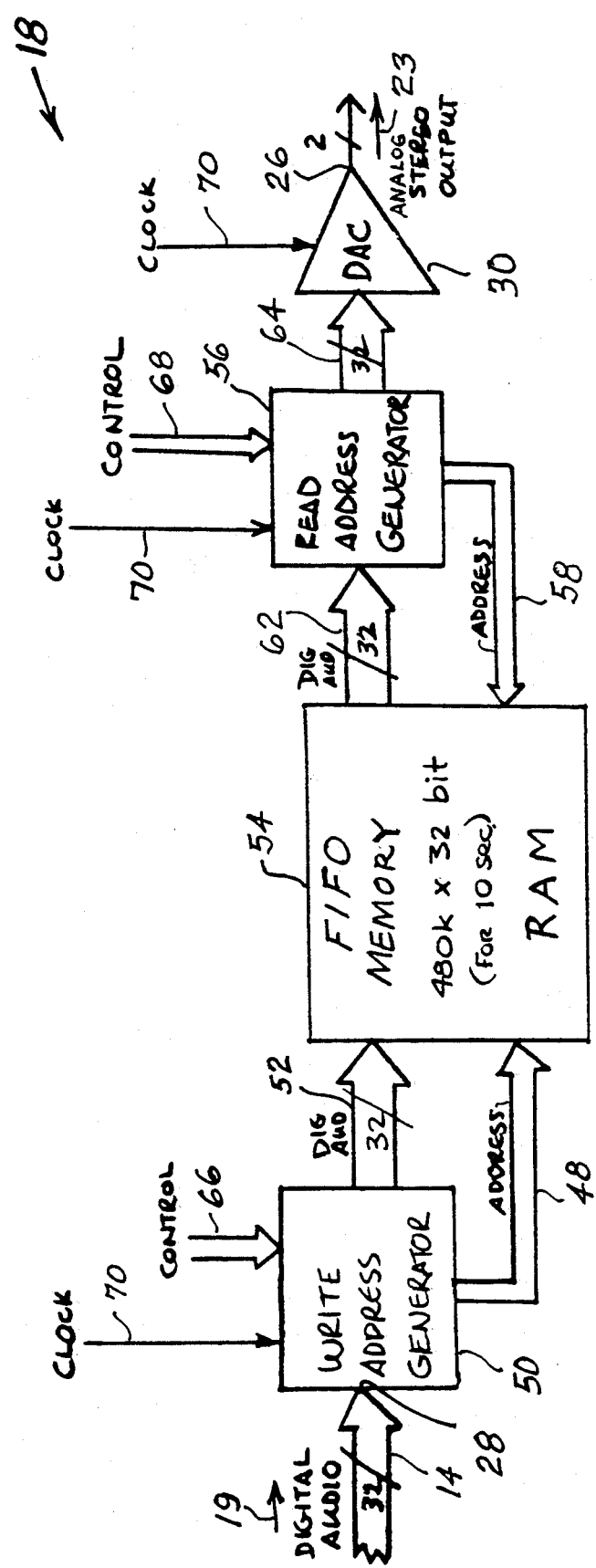
FIG. 2 is a schematic diagram of a digital delay line system incorporated in the synchronization system of FIG. 1.

FIG. 2 shows a functional block diagram of a presently preferred digital delay line system, commonly called a FIFO, or first-in first-out overwriting memory store. This digital delay line system 18 operates as follows: the higher quality digital audio signal data 19 is presented via the 32-line input buss 14 to the input 28 of a write address generator 50.

An address (memory location) 48 is assigned and, as indicated by the arrow 52, the digital audio information is stored there in a random access memory (RAM) 54. The digital information is written into the memory 54 subsequentially until all the memory is filled. Then, the process is repeated by replacing the previous data with the new information in the same sequence. The memory 54 must be sufficient to store the required number of data samples to make up the desired delay time of ten seconds. For example, to accommodate ten seconds of left stereo sixteen-bit words and right stereo sixteen-bit words at a sample rate of 48 kHz the memory capacity is at least 480 k times 32 bits, as indicated.

The output at 26 from the whole delay line system 18 comes via a read address generator 56. For a maximum delay of, say, ten seconds, the chosen address indicated by the function arrow 58 is that of the digital audio data (digital audio word) which has been resident in the memory 54 for the maximum available ten seconds, i.e. the longest-resident digital audio word in memory. This longest-resident digital audio word is the first-assigned digital audio word of all words currently in memory. This maximum-delay word is then presented, as indicated by the function arrows 62 and 64, to the digital-to-analog converted (DAC) 30 and appears at the output 26.

This maximum delay situation as just described means that the output data stream 62, 64 is exactly the same as the input data stream 52, except that a ten-second time difference exists. Turning attention back to FIG. 1, this maximum delay situation is indicated when the delay output tap 32 is located at the very output end of the delay line system 18.

It is noted that the delay time may quickly and appropriately be reduced from maximum by the advantageous expedient of assigning a new address 58 (FIG. 2) to the read address generator 56 from which the sequential process continues. For example, assigning an address 58 halfway through the memory 54 instantly advances the high quality audio signal 23 in time by fifty percent of the delay line's length, namely, by five seconds in this delay line system 18. This process of assigning a new address 58 from which to chose the next word in such a FIFO overwriting store is sometimes called "changing the read pointer position".

FIGS. 1 and 2 both show the digital audio input buss 14 as having 32-lines. These 32-lines provide for a parallel feed of two 16-bit wide pulse code modulated (PCM) words for left and right stereo digital audio as occurs in currently commercially available high quality digital sound systems. The digital output 62, 64 is similarly on 32-lines, and this digital output feeds the DAC 30 which provides the high quality analog stereo sound signal 23 for driving the theater's sound system.

As shown in FIG. 2, there are two control busses 66 and 68 coming from the correlation system 17 (FIG. 1). For clarity of illustration in FIG. 1 and for clear explanation, these control busses 66 and 68 are considered to be included within the control pathway 67 shown in FIG. 1 extending from the correlation system 17 to the delay output tap 32, 34. It is to be understood that each of these control busses 66 and 68 contains multiple communication lines. The first control buss 66 serves to control the write address generator 50, and the second control buss 68 controls the read address generator 56 and serves to determine the read address location 58, i.e. "determines the read pointer's position."

There is a master clock 69 (FIG. ) for controlling the timing of the digital processes throughout the synchronization system 40. As indicated by the arrows 70, clock pulses are fed to the write address generator 50, the the read address generator 56, and to the DAC 30.

CORRELATION SYSTEM 17

As discussed above in the preliminary description of the correlation system 17 (FIG. 3) and its operation, this correlation system serves as the controller for the synchronization system 40 (FIG. 1 or 6) as a whole. This correlation system 17 includes signal processors, digital storage capability, correlation circuits, control circuits and a central processing unit (CPU) 31 which controls and keeps track of all activities within the synchronization system 40.

In the activity of correlation, the system 17 is continuously assuring that the higher quality digital audio being supplied to the DAC 30 (FIG. 2) at the output end 26 of the delay line system 18 is the same, but higher quality, sound as the conventional analog audio signals 21 (FIG. 21) on the film being shown. If the film audio signal 21 becomes different from the digital audio signal about to arrive at the DAC 30, then the correlation system 17 causes the overall synchronization system 40 to make an appropriate response, as explained in detail later.

It is to be understood that as used in this specification the term "correlation" is intended to have a precise engineering or mathematical meaning. As used herein "correlation" means to compare and calculate unambiguously that the ordinary sound signal 21 (FIG. 21) which is how being received at the input connection 13 and the higher quality sound signal being delivered from the output end of the digital delay line system 18 carry the same audio message.

Since the ordinary sound signal 21 is being derived from the portion of the motion picture currently being shown, this ordinary signal always contains the appropriate audio message to accompany the current picture. When missing picture frames are encountered due to a film splice, the motio picture suddenly apparently "jumps ahead" in time, and the ordinary quality audio message 21 makes a similar corresponding jump ahead in time. When a difference in the two audio messages is sensed by the correlation system 17, a "synch search" mode immediately is initiated, and the fader 16 is caused to switch over to convey the ordinary quality sound signal 21 to the theater sound system. The correlator 17 immediately begins to determine the new address to place the read pointer 58 (FIG. 2), which is later in time or closer to the input end 19. As soon as the new address 58 for the same audio message has been found, synchronization has been re-established, and the stored digital audio from this new address immediately is sent through the DAC 30 to the output 26. The fader 16 (FIG. 1) is immediately switched back to convey the appropriate, re-synchronized high quality audio signal 23 to the theater sound system.

It is to be noted that this correlation process is re-iterative. That is, the envelopes of two audio signals are being compared by repeatedly rapidly comparing in sequence the magnitudes of the voltages of the envelope of the high quality digital audio at a plurality of addresses in a memory store with the present magnitude of the voltage of the on-going ordinary quality audio. In effect, the correlation process is looking for (is seeking) that particular sequence of addresses ona memory store where the magnitudes of the voltages of the envelope of the high quality digital audio over a brief time interval match with (track along with) the magnitudes of the voltages of the envelope of the on-going ordinary audio over the same brief time interval. In other words, a sequence of numbers representing magnitudes of the voltages of the high quality audio envelope are correlated with, i.e. are matched over a brief time interval with (and re found to track along with), a sequence of numbers representing magnitudes of the voltages of the on-going ordinary quality audio envelope occurring over this same brief time interval. In the present embodiment of this invention, this correlation is advantageously achieved by re-iterative subtraction. Various sequences of number for the envelope of the high qulity sound and the current (at the present time) sequences of numbers for the envelope of the on-going ordinary sound are repeatedly subtracted from each other to provide difference values "D" in FIG. 3. Difference values "D" which are near zero and which remain near zero over an interval of time at a particular sequence of memory store addresses, i.e. at a particular read pointer position, are said to be yielding a high correlation, i.e. to be indicating that this particular read pointer position is the appropriate position for synchronization.

When the re-iterative correlation is "high," then the correlation system 17 accepts the read pointer position. IF the correlation is poor, i.e. the difference values "D" are not near zero, then the comparison is repeated, until a new pointer position is found where the correlation again becomes high and remains high over a brief interval of time.

Also, during the time while no pointer position is found where the correlation is high, then the fader 16 is caused to remain changed over to the conventional analog signal 21 so that this conventional signal 21 is supplied at the output 12 to the theater's loudspeaker system. When a new pointer position is found where the correlation is high, the correponding high quality digital audio signal from this new pointer position immediately goes to the memory store output 26 (FIG. 2), and the fader 16 is rapidly switched to feed this resulting new high quality audio signal 23 to the output 12.

Figure 3:
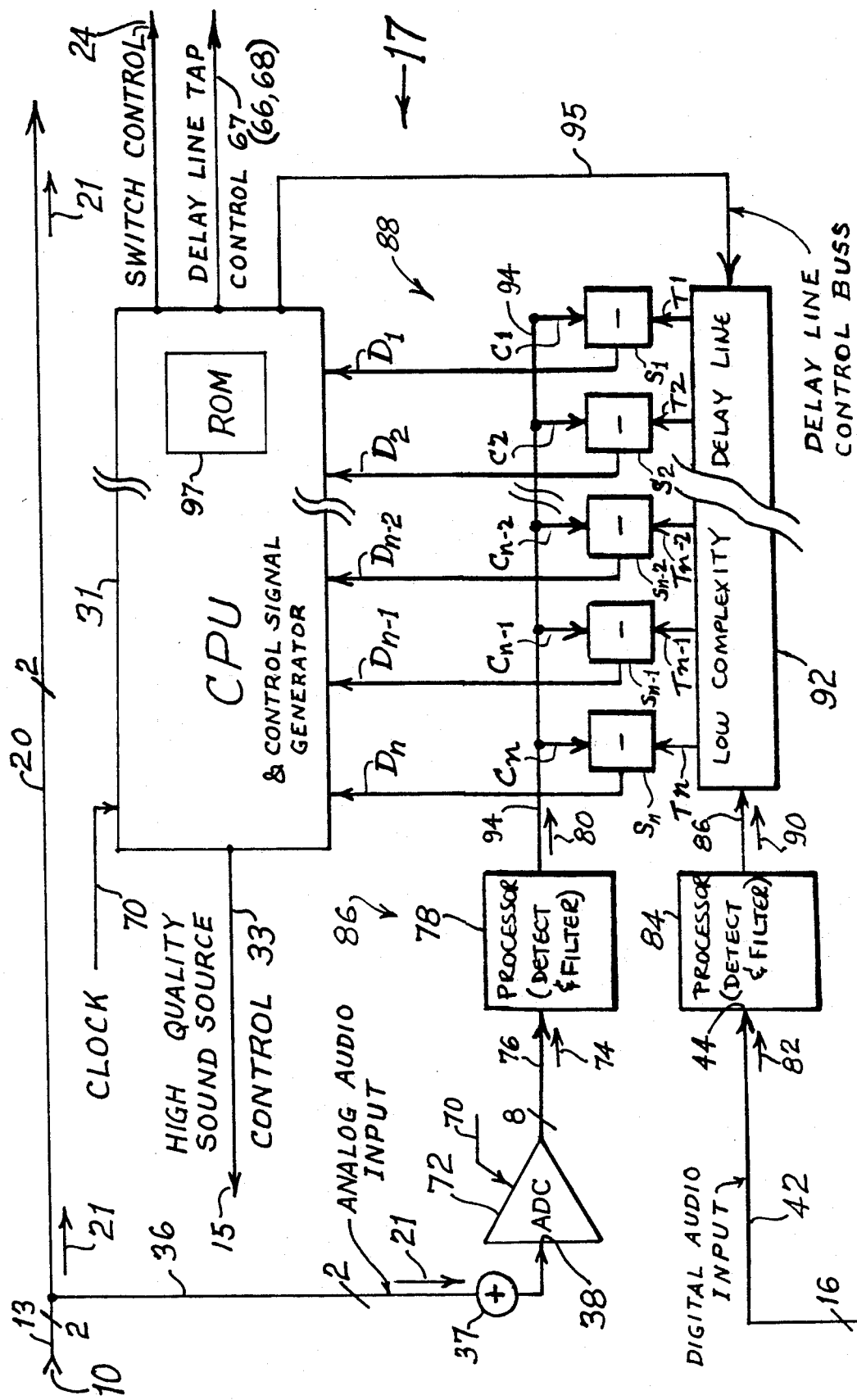
FIG. 3 is a schematic diagram of a correlation system included in the synchronization system of FIG. 1.

FIG. 3 shows a functional block diagram of the correlation system 17 for making the re-iterative subtractive comparison as described above. The stereo analog audio signal 21 approaching the input terminal 38 has its left (L) and its right (R) stereo signals added together in adder 37, and the resulting monaural analog signal enters the input 38 of an ADC (analog-to-digital converter) 72 in which this monaural analog signal is converted to an 8-bit monaural digital representation 74. It is this monaural signal which is converted into the 8-bit digital representation 74. This digital representation 74 is fed by an 8-line connection 76 into a processor 78 which obtains the absolute instantaneous values of the digital representation 74 by an absolute value algorithm which causes all negative numbers to become positive an then band limiting the result by a low pass digital filter algorithm which provides new digital numbers representing the "absolute value envelope" (no negative numbers) confined to less than a predetermined frequency. For example, in the present embodiment of the inventnion this predetermined frequency limit for the low-pass digital filter algorithm is 50 Hz.

The reason for using a low-pass upper limit of less than about 50 Hz is that such a frequency is sufficiently high to characterize with suitable definition the "syllabic structure" of intelligible audio messages and is low enough to avoid imposing unduly or unnecessarily high rate requirements on the correlation system 17.

The result of this processing in the processor 78 is to provide a digital signal 80 on a buss 94 containing a sequence of digital numbers representing the absolute value envelope confined to less than 50 Hz of the monaural combination of the L and R analog audio signal 21. Therefore, this representative digital signal 80 advantageously gives a useful representation of the audio magnitude distribution occurring within the "syllabic structure" of the on-going ordinary quality audio message 21. In other words, this envelope representation signal 80 contains very useful information about the on-going sequence of syllables (on-going significant events) which characterize the ordinary quality audio message 21, but this envelope representation signal 80 does not contain enough digital data to define the precise waveform of the ordinary quality analog stereo signal 21. By virtue of using this syllable-type absolute value envelope representing signal 80, the rate requirements of the correlation system 17 are correspondingly lower as compared with using more precise representation of the original analog stereo signal 21.

The digital signal 82 supplied over the 16-line buss 42 comprises two 8-bit words for the respective left and right stereo digital audio. The eight least significant bits of the L and R stereo digital words in the high quality signal 19 on the 32-line input buss 14 are omitted from the 16-line buss 42, as discussed further above. This digital signal 82 is supplied to a processor 84 which operates in a manner similar to the processor 78 plus the added 37 and ADC 72 described above. Thus, the processor 84 combines the L and R 8-bit stereo words 82 into an 8-bit monaural word and then uses an absolute value algorithm and a low-pass digital filter algorithm confined to the same frequency limit being used by the processor 78, namely 50 Hz, for producing a digital signal 90 on a buss 86. This digital signal 90 contains a sequence of numbers representing the absolute value envelope confined to less than 50 Hz of the combination of the L and R digital audio signal 82. Therefore, this representative digital signal 90 gives a useful representation of the audio magnitude distribution occurring within the "syllabic structure" of the high quality digital audio message 19 (FIG. 1). This envelope representation signal 90 contains very useful information about the sequence of syllables (sequence of significant events occurring with passage of time) which characterize the high quality digital audio message 19, but this envelope representation signal 90 contains considerably less than enough digital data to define the precise analog waveform which is delineated by the high quality stereo signal 19.

In the functional block diagram in FIG. 3, the envelope representation signal 90 is being shown supplied by a connection 86 to a low complexity delay line 92 having the same time-delay length, for example ten seconds, as the high quality digital delay line system 18 (FIGS. 1 and 2). The envelope signal 90 (for digital audio message 19) precedes the other envelope signal 80 (for the analog audio message 21) by the time-delay of the delay lines 92 and 18, say ten seconds, because the high quality auxiliary digital sound medium was started running ten seconds before the cinema film was started running. This ten-second "head start" of the digital audio message thus causes the envelope signal 90 to precede the envelope signal 80 by ten seconds in this embodiment of the invention. Consequently the delay line 92 has been supplied with and has become filled with the most recent ten seconds of the envelope representation signal 90.

It is to be understood that a delay of less than ten seconds, for example eight seconds or six seconds can also be used to good effect, if desired. The acceptable compromise of using a shorter delay time than the presently preferred pre-determined delay in the range of about 8 seconds to 10 seconds merely causes lessened capability to maintain uninterrupted synchronizatoin of the higher quality sound when showing spliced motion picture film wherein the splices involve significant time-segments of missing frames. Due to an acceptable compromise of using a shorter delay time storage capability than about 8 seconds, the fader 16 will switch over somewhat more often to the conventional signal 21 and some such switchovers will have a longer time duration than would occur with a longer delay time capability when showing any given motion picture film with a significant number of splices. At the present time we believe that a delay time storate capability of about three seconds is the practical lower limit for suitable, good effect operation with the standard used release print containing significant numbers of significantly long missing time-segment splices.

Inviting attention again to FIG. 3, (and as explained above) the envelope signal 90 is earlier in time than the signal 80 by the pre-determined delay-time capability of the low complexity delay line 92 which exactly equals the predetermined delay-time capability of the high quality digital delay line system 18. This low complexity delay line 92 is shown as having numerous output taps T1 through Tn located at spaced equal time-delay increments. For example, these time-delay intervals "T" are spaced uniformly 100 milliseconds apart.

Figure 3A:
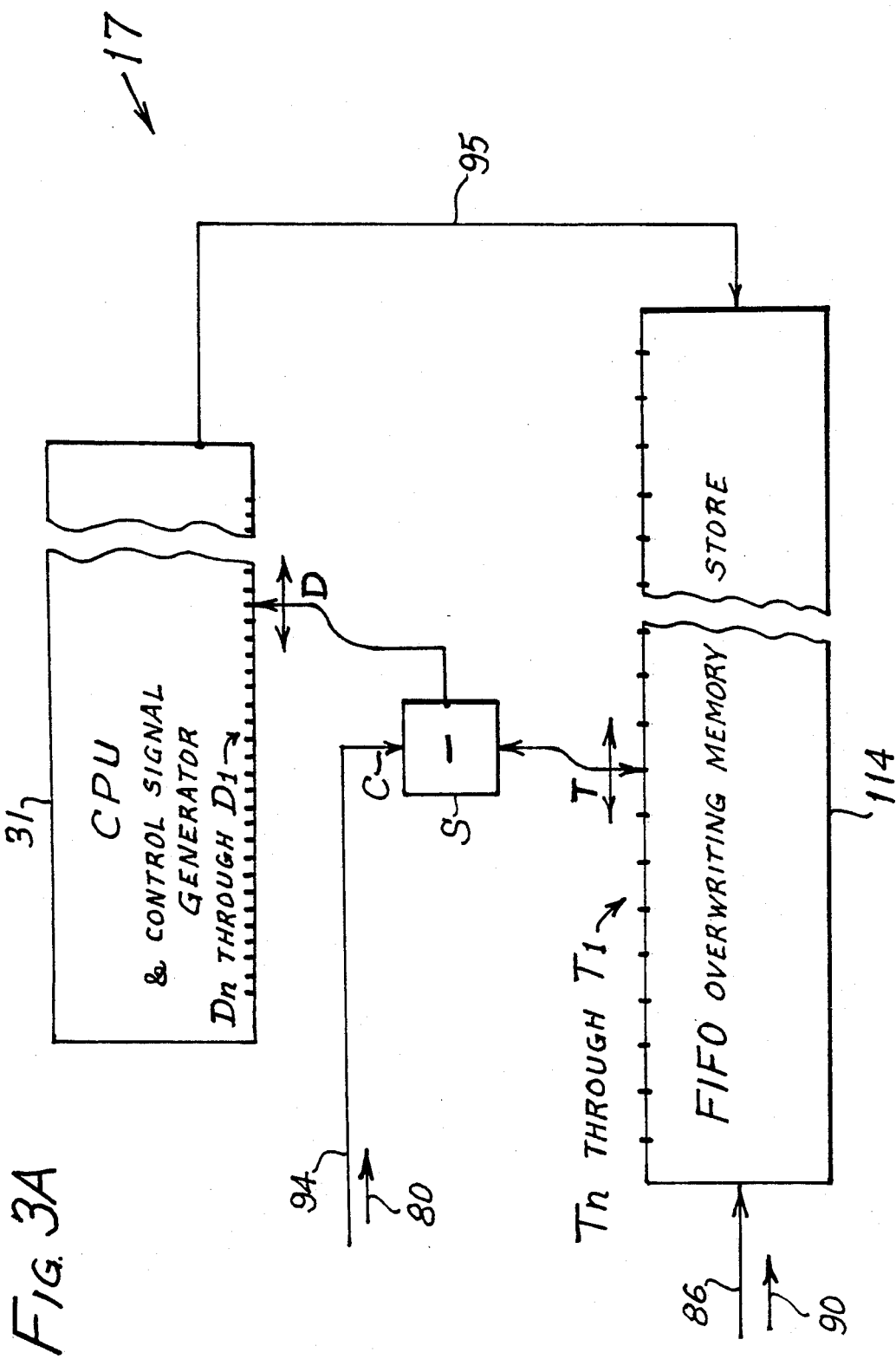
FIG. 3A is a functional block diagram of a presently preferred system for accomplishing the correlation and comparison functions of FIG. 3.

It is helpful in explaining and in understanding this embodiment of the invention to think initially in terms of taps "T" spaced along a delay line 92 by uniform increments of time, e.g. 100 milliseconds. Further description below in conjunction with FIG. 3A showing a FIFO overwriting memory store 114 will complete the full explanation and understanding of this correlation system 17 (FIG. 3).

Sequential re-iterative comparisons C1 through Cn are being made between the on-going digital numbers 80 on the buss 94 with the stored digital numbers 90 at the respective time points T1 through Tn in the delay line 92. These comparisons are advantageously being made by sequential subtractions S1 through Sn, and the resulting sequential numerical differences D1 through Dn are fed into the CPU of the functional block 31. The particular re-iterated subtractions S whose difference D currently (now) has a numerical value approaching zero and remaining near zero over a brief interval of time is that subtraction whose input tap T has present numbers equal to the present instantaneous numbers of the envelope representation 80 on the comparison buss 94. It is this particular D presently having a near zero value which serves as the "marker" for the CPU 31 for selecting the appropriate delay time to use for moving the output tap 32 (FIG. 1) to the appropriate delay time location in the digital delay line system 18.

The foregoing explanation in terms of a moving tap is for aiding in understanding the present embodiment of the invention. With attention invited to FIG. 2 and FIG. 3 it will be seen that it is the particular re-iterated subtraction S whose difference D currently has a near zero value and which remains near zero over a brief time interval which serves as the "marker" for causing the CPU 31 acting through the control buss 68 to instruct the read address generator 56 to address 58 the new appropriate memory location in the memory unit 54. Starting at this new address the read signal generator 56 now causes the read pointer position 58 to scan through the sequential locations in the memory store 54 for bringing the appropriate sequence of digital words to the DAC 30 for producing the appropriate high quality analog stereo voltage output signal 23 synchronized with the ordinary quality signal 21.

It is presently preferred that a FIFO overwriting memory store 114 (FIG. 3A), similar to that shown in FIG. 2, be used to serve as this low complexity delay line 92 (FIG. 3). Then, a microprocessor, CPU, using a time-share program, serves to prform the numerous subtractions S1 . . . . Sn and acts through a control buss 95 in conjunction with the FIFO overwriting memory store system 114.

For example, in this correlation system 17 the CPU is performing subtractions S (FIG. 3A) at the rate of 1,500 samples per second. A subtraction S (FIG. 3A) is performed, and the resultant difference goes into a particular memory store location D1 through Dn in the CPU. Then the next subtraction is performed using the number now stored at an address in the FIFO memory which is spaced 100 milliseconds from the address for the preceding subtracted number, and the resultant difference goes into a next particular memory store location D1 through Dn in the CPU. This sequential subtraction is continued until all of the difference memory store locations D1 through Dn have each received respective difference numbers and then the subtraction process continues repeating over and over at the sample rate of 1,500 per second. The memory store locations D1 through Dn in the CPU are each cumulative, and they each have the same discharge or drain-down rate. Thus, the particular memory store location D1 through Dn, which currently is storing a cumulative difference nearest to zero and whose stored cumulative difference remains nearest to zero, is the "marker" as described above for selecting the appropriate read address 58 (FIG. 2) for synchronization.

In this example, where the subtraction sample rate is 1,500 per second, where the delay time storate of the FIFO memory store 54 in FIG. 2 and also that of the store 114 in FIG. 3A is 10 seconds, and where the sampled addresses are spaced apart 100 milliseconds (0.1 second), then there are 100 addresses (which means R equals 100) being sampled, and so the repetition rate for sampling each particular address in 15 times per second.

there is a realistic basis for these values being used in this embodiment. Sound travels at about 1,100 feet per second through air at sea level. In a theater where some of the audience is about 110 feet away from the screen, the audience in the rear of the theater is not concerned that the audio message as actually heard is 1/10th of a second behind the action being seen on the screen. Thus, a 100 millisecond (1/10th sec.) spacing of the sampled addresses is sufficiently closed together to yield high quality results, because the time synchronization between the high quality sound 23 and the motion picture being seen will always be within 1/10th of a second. Actually, the synchronization will be within much less than this 1/10th second for most of the time, because the CPU is continually acting in a direction to cause the near-zero cumulative difference stored in the particular current "marker" memory storage location D to approach zero, meaning that progressively closer synchronization is being provided, until such time as the occurrence of the next film-splice break due to missing frames.

Figure 6:
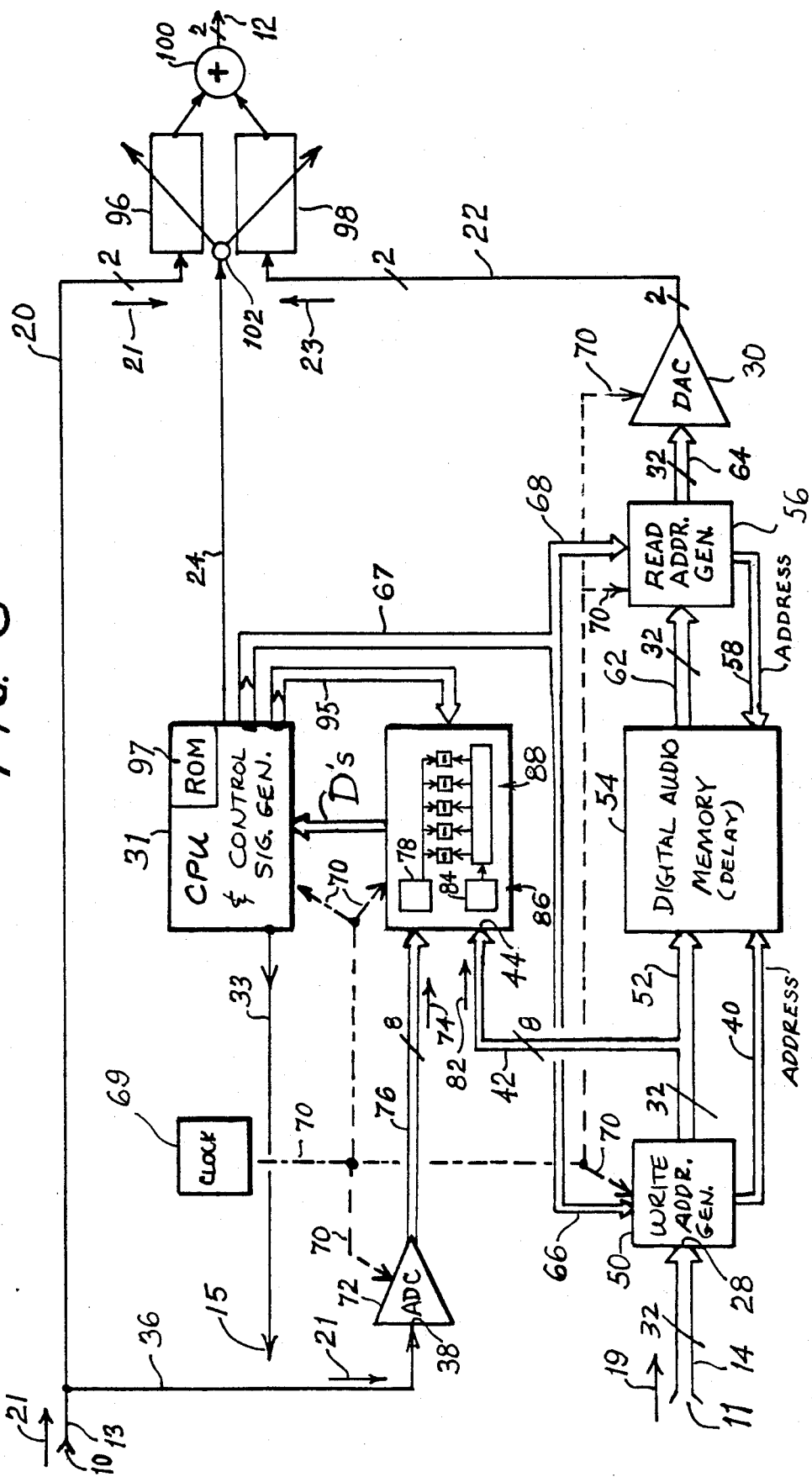
FIG. 6 is a functional block diagram of the entire synchronization method and system shown in FIG. 1, except that FIG. 6 shows more details of the entire system, as will be better understood after considering the details of the various components and their functions as explained in connection with the intervening FIGS. 2 through 5.

The CPU 31 controls the entire synchronization system 40 (FIG. 1 or FIG. 6). Thus, this CPU examines all of the cumulative correlator differences stored in memory locations D1. . . . Dn, chooses the appropriate pointer location, controls the read address generator 56 (FIG. 2) in the digital audio delay line system 18. In addition the CPU continues to update the write address generator 50. Concurrently, the CPU runs the low complexity delay line 92 (i.e. runs the FIFO overwriting memory store system 114 which serves as this delay line 92). At all times the CPU is providing control signals over the command path 33 to control operation of the auxiliary high quality drigital sound signal source. The CPU provides control signals over the command path 24 for placing and keeping the fader 16 in the appropriate modes.

Also, the CPU includes read-only memory storage containing the protocols of the start and stop routines and timing sequences for the operation of the entire synchronization system 40 (FIGS. 1 and 6) including operation of the auxiliary digital sound storage medium. These start and stop routines and timing sequences in the CPU 31 are invoked by appropriate mechanical controls (not shown), as may be desired.

SMOOTH TRANSITION FADER SWITCH

Figure 4:
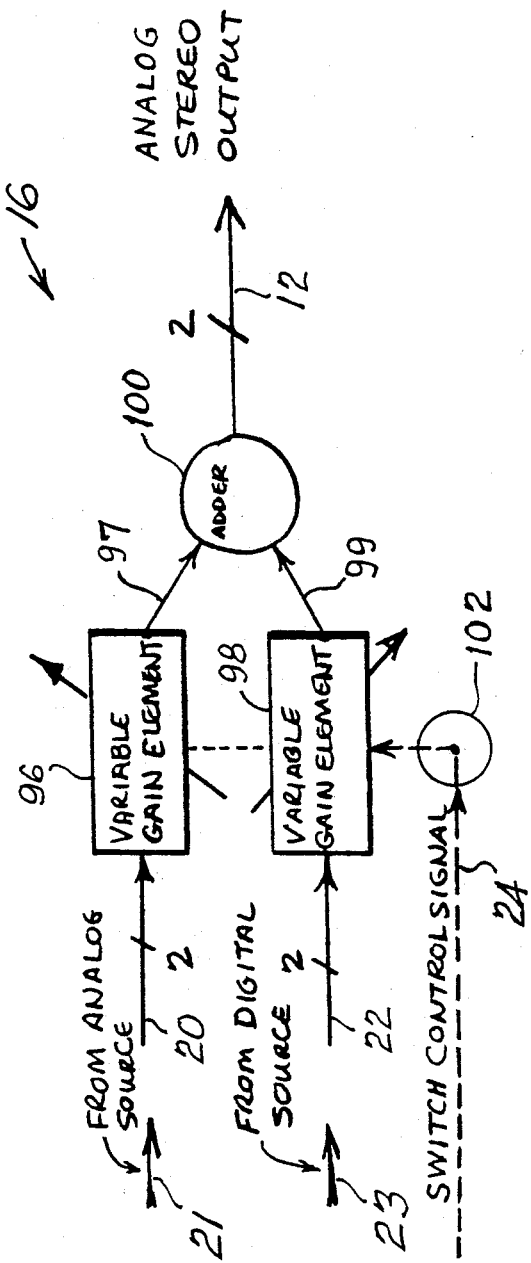
FIG. 4 is a schematic diagram of a fader included in the synchronization system of FIG. 1. This fader serves to switch the output signal smoothly between a higher quality auxiliary sound signal and an ordinary quality sound signal. The vast majority of the total time the higher quality sound signal is provided through the fader to the output. During those occasional instances when synchronism is momentarily lost due to splices involving missing segments of the moving picture source, as is explained later in detail, the fader automatically smoothly switches over to provide the ordinary quality sound signal to the output for maintaining continuity of the audio message, while synchronization is being regained for the higher quality sound signal, as explained later.

FIG. 4 shows the components of the smooth transition fader switch system 16. The ordinary quality sound signal connection 20 from the analog source feeds ordinary quality analog sound signal 21 into a first variable gain element 96. The high quality analog sound signal 23 is fed over the connection 22 to a second variable gain element. These two variable gain elements 96 and 98 are identical and have respective output connections 97 and 99 to an adder 100 whose output connection 12 feeds either the signal 21 or 23 to the theater's sound system.

These variable gain elements 96 and 98 are, for example, volume controls ganged together and driven in opposing directions by a reversible drive motor 102. Control signals fed over the command connection 24 cause the drive motor 102 to turn for a predetermined increment in one direction or the other for increasing the volume of the appropriate signal 23 or 21 while simultaneously decreasing the volume of the other of these signals.

Figure 5:
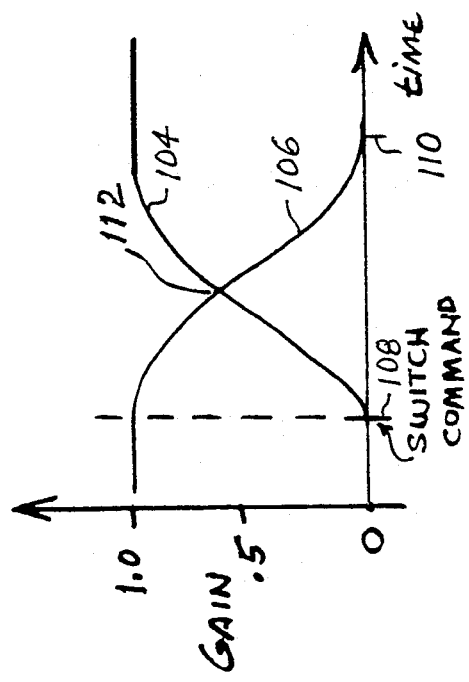
FIG. 5 is a plot illustrating switch-over characteristics of the fader of FIG. 4, showing how the higher quality sound signal voltage gain is smoothly decreased during a switch-over interval of time, while the lower quality sound signal voltage gain is smoothly increased, and vice versa during a reverse switch-over.

In FIG. 5 are shown the voltage gain output characteristics 104 and 106 of these two variable gain elements 96 and 98, respectively. These gain characteristics are plotted versus time as normalized curves in FIG. 5, and thus a value of unity equals full gain output. For example, the interval of time from the time point 108 to the time point 110 is predetermined to be one quarter of a second.

As an example for further explaining operation of the fader 16 (FIG. 4) assume that a close sequence of film splices has just been encountered involving missing frames whose cumulative time interval happens to exceed the delay time capability of the synchronization system 40. Consequently, at the time instant 108 a switch command is given via connection 24 for changing the sound signal on the stereo output connection 12 from the high quality signal 23 to the ordinary quality signal 21, while at this time point 108 the synchronization system 40 begins operating in its "synch search" mode as explained previously. The crossover point 112 of these two curves is at normalized gain of 0.707. Thus, in one eighth of a second after the switchover command has been given, the ordinary sound signal 21 is the audio message effectively being heard by the audience. As soon as synchronism has become re-established, a command signal given via connection 24 causes the fader system 16 to switch back to feed the high quality signal 23 to the stereo output connection 12. The gain characteristics 106 and 104 have the same shape when switching back to high quality sound, and so in one-eighth of second after a switch back command, the audio message effectively heard by the audience is the high quality sound.

In order to smooth out these transitions between high-ordinary and ordinary-high quality sound, an electronic adder 100 is interposed between the variable gain output connections 97 and 99 and the final stereo output connection 2. During the switchover time interval from time point 108 to time point 110, this adder 100 contains at the same time both of the audio signals 23 and 21 at their respective reduced levels as shown by the respective curves 106 and 104. These curves 106 and 104 are shaped so that their gain levels as combined at each instant by the adder 100 during switchover effectively maintains unity acoustical power level as heard by the audience.

It is to be understood that with an appropriately long predetermined delay time storage capability in the synchronization system 40, for example in the presently preferred range of about 8 to 10 seconds as explained, then the occurrence of switching of the fader 16 during showing of a cinema film will be infrequent for standard used release prints.

FIG. 6 shows the entire synchronization system 40 in greater detail than FIG. 1. It is believed that this detailed presentation in FIG. 6 will be more easily understood and appreciated after considering FIGS. 1-5 and the detailed description relating to those FIGURES.

As various possible embodiments of the present invention may be made for synchronizing a higher quality audio sound signal with another audio sound signal containing the same audio message without departing from the scope of this invention, it is to be understood that all matter set forth in the description and shown in the drawings is for the purpose of illustrating and teaching the invention and is not intended to be exhaustive of its many features which will be seen by those skilled in the art in view of this disclosure. For example, the ordinary sound signal source may be made from a "master recording" or a high quality duplication of this "master recording". Similarly, the high quality digital signal source may be made from the "master recording" or a high quality duplication of this "master recording". Thus the term "original source" or "master recording" is to be interpreted sufficiently broadly to include high quality duplications thereof which contain the same audio message, i.e. which have esseentially the same audio informational content.

We claim:

1. In the showing of viewable images depicting motion and wherein the viewable images are provided by operation of a first medium containing first means providing a first sound signal to provide an audio message of first quality accompanying the viewable images and wherein said means for providing said first sound signal are made from a master recording, the method of synchronizing with said first sound signal a second sound signal of higher quality than said first quality but containing the same audio message to accompany the showing of the viewable images, said method comprising the steps of:
   providing a second medium containing second means for providing said second sound signal;
   making said second means from the master recording for enabling said second means to provide said second sound signal of said higher quality but containing the same audio message;
   starting operation of said second medium a predetermined time interval before commencing the operation of the first medium;
   thereafter simultaneously operating both said second medium and said first medium for simultaneously providing both said second sound signal and said first sound signal but wherein the audio message of said second sound signal is preceding by said predetermined time interval the audio message of said first sound signal;
   accessibly placing in temporary storage a continuously updated current portion of said second sound signal occurring over a current time interval at least equal to said predetermined time interval; and
   continiously removing from temporary storage successive increments of said second sound signal correlated with the currently occurring first sound signal for providing said second sound signal synchronized with said first sound signal; and
   utilizing the synchronized second sound signal for providing the same audio message as said first sound signal but at a higher quality to accompany the showing of the viewable images.

2. The method of synchronizing with a first sound signal a second sound signal of higher quality as claimed in claim 1, wherein:
   said predetermined time interval is at least 3 seconds.

3. The method of synchronizing with a first sound signal a second sound signal of higher quality as claimed in claim 2, wherein:
   said predetermined time interval is in the range between about 6 seconds and about 10 seconds.

4. The method of synchronizing with a first sound signal a second sound signal of higher quality as claimed in claim 1, wherein:
   the successive increments of said second sound signal are correlated with the currently occurring first sound signal by the steps of:
   deriving a first sequence of values representative of the characteristics of the syllabic structure of the currently occurring first sound signal;
   deriving a second sequence of values representative of the syllabic structure of said current portion of said second sound signal in temporary storage;
   selecting those successive values of the second sequence which correlate with said first sequence of values; and
   removing from temporary storage those successive increments of said second signal whose values correlate with said first values.

5. The method of synchronizing with a first sound signal a second sound signal of higher quality as claimed in claim 4, wherein:
   said step of selecting those successive values of the second sequence which correlate with said first sequence of values includes the steps of:
   performing subtractions between the values of said first sequence and the values of said first sequence and the values the said second sequence; and
   determining the minimum differences resulting from the subtractions for selecting those successive values of the second sequence which correlate with said first sequence of values.

6. The method of synchronizing with a first sound signal a second sound signal of higher quality as claimed in claim 1, wherein said first sound signal is an analog sound signal and said second sound signal is a digital sound signal, said method including the steps of:
   converting said first sound signal, which is an analog sound signal, into a first sequence of numbers representative of the envelope of said first sound signal;

converting said current portion of said second sound signal, which is a digital sound signal, into a second sequence of numbers representative of the envelope of said second sound signal;

performing re-iterative subtractions between said numbers of said first sequence and said numbers of said second sequence;

determining the minimum differences continuously resulting from said re-iterative subtractions; and removing from temporary storage successive increments of said second sound signal corresponding with numbers of said second sequence yeilding said minimum differences for providing said second sound signal synchronized with said first sound signal.

7. The method of synchronizing with a first sound signal a second sound signal of higher quality as claimed in claim 1 including the steps of:

converting said first sound signal into a first sequence of numbers representative of the audio pattern of said first sound signal;

converting said current portion of said second sound signal into a second serquence of numbers representative of the audio pattern of said second sound signal;

performing re-iterative subtractions between said numbers of said first sequence of numbers and said numbers of said second sequence;

determining the minimum differences continuously resulting from said re-iterative subtractions; and removing from temporary storage successive increments of said second sound signal corresponding with numbers of said second sequence yielding said minimum differences for providing said second sound signal synchronised with said first sound.

8. The method claimed in claim 6, including the steps of:

converting said first sound signal into a first sequence of digital numbers representative of the syllabic structure of the envelope of said first sound signal;

converting said current portion of said second sound signal into a second sequence of digital numbers representative of the syllabic structure of the envelope of said second sound signal;

performing re-iterative subtractions between said digital numbers of said first sequence and said digital numbers of said second sequence; and determining the minimum differences continuously resulting from said re-iterative subtractions between said digital numbers of said first and second sequences of digital numbers.

9. The method claimed in claim 6, including the steps of:

converting said first sound signal into a first sequence of digital numbers representative of the absolute value envelope of said first sound signal;

converting said current portion of said second sound signal into a second sequence of digital numbers representative of the absolute value envelope of said second sound signal;

performing re-iterative subrractions between said digital numbers of said first sequence and said digital numbers of said second sequence; and determining the minimum differences resulting from said re-iterative subtractions.

10. The method of claim 7, including the steps of:

converting said first sound signal into a first sequence of digital numbers representative of the absolute value envelope of the audio pattern of said first sound signal;

converting the current portion of said second sound signal into a second sequence of digital numbers representative of the absolute value envelope of the audio pattern of said second sound signal;

performing re-iterative subtractions between said digital numbers of said first sequence and said digital numbers of said second sequence;

determining the minimum differences continuously resulting from said re-iterative subtractions; and removing from temporary storage successive increments of said second sound signal corresponding with said digital numbers of said second sequence yielding said minimum differences resulting from said second sound signal for providing said second sound signal synchronized with said first sound signal.

11. The method of claim 6, wherein:

said first sequence of numbers is representative of frequency-limited characteristics of the envelope of said first sound signal;

said second sequence of numbers is representative of frequency-limited characteristics of the envelope of said current portion of said second sound signal; and said frequency-limited characteristics are both limited below the same predetermined upper frequency limit.

12. The method of claim 11, wherein:
said predetermined upper frequency limit is 50 Hz.

13. The method claim 7, wherein:
said first sequence of numbers is representative of audio pattern characteristics limited below a predetermined upper frequency limit; and
said second sequence of numbers is representative of audio pattern characteristics limited below said predetermined upper frequency limit.

14. The method of claim 13, wherein:
said predetermined upper frequency limit is 50 Hz.

15. The method of claim 8, wherein:
said first sequence of digital numbers is representative of syllabic structure characteristics of the envelope of said first sound, said characteristics being confined to those occurring below a predetermined upper limit;
said second sequence of digital numbers is representative of syllabic structure characteristics of the envelope of said second sound signal, said characteristics being confined to those occurring below said predetermined upper frequency limit.

16. The method of claim 15, wherein:
said predetermined upper frequency limit is 50 Hertz.

17. The method of claim 9, wherein:
said first sequence of digital numbers is representative of absolute value envelope characteristics limited below a predetermined upper frequency limit; and
said second sequence of digital numbers is representative of absolute value envelope characteristics limited below said predetermined upper frequency limit.

18. The method of claim 17, wherein:
said predetermined upper frequency limit is 50 Hertz.

19. The method of claim 10, wherein:

said first sequence of digital numbers is representative of absolute value envelope characteristics limited below a predetermined upper frequency limit; and
said second sequence of digital numbers is representative of absolute value envelope characteristics limited below said predetermined upper frequency limit.

20. The method of claim 19, wherein:
said predetermined frequency limit is 50 Hertz.

21. The method of synchronizing with an analog signal of an audio message a digital signal of said audio message, and wherein the audio message of said analog signal is derived from a master recording, said method comprising the steps of:
causing said digital signal of the audio message to be derived from the master recording; and
correlating intrinsic characteristics of said audio message of said digital signal with intrinsic characteristics of said audio message of said analog signal for synchronizing said digital signal with said analog signal.

22. The method of claim 21, wherein:
said intrinsic characteristics comprise syllabic structure characteristics of said audio message of said digital and analog signals, respectively.

23. The method of claim 22, wherein:
said syllabic structure characteristics are limited to those occurring below a predetermined upper frequency limit.

24. The method of claim 23, wherein:
said predetermined frequency limit is 50 Hertz.

25. The method of claim 24, including the steps of:
correlating said intrinsic characteristics of said analog signal by re-iterative subtractions;
wherein lowest continuous differences resulting from said re-iterative subtractions are indicative of desired correlation.

26. The method of claim 21, wherein:
said intrinsic characteristics comprise audio pattern characteristics of said digital and analog signals, respectively.

27. The method of claim 21 wherein:
said intrinsic characteristics comprise syllabic structure characteristics of the absolute value envelope of said digital and analog signals, respectively.

28. The method of claim 21 wherein:
said intrinsic characteristics comprise audio pattern characteristics of the absolute value envelope of said digital and analog signals, respectively, limited to below a predetermined upper frequency limit.

29. The method of claim 28 wherein:
said predetermined upper frequency limit is 50 Hertz.

30. The method of claim 27 including the steps of:
causing the audio message of said digital signal to precede the audio message of said analog signal by a predetermined time difference;
temporarily storing a continuously updated current segment of said digital signal at least equal in time duration to said time difference; and
withdrawing from said current segment of said digital signal portions if said current segment having intrinsic characteristics correlating with intrinsic characteristics of said analog signal for synchronizing said digital signal with said analog signal.

31. Method of claim 30, wherein:
said intrinsic characteristics comprise syllabic structure characteristics of said audio message of said digital and analog signals, respectively.

32. Method of claim 39, wherein:
said syllabic structure characteristics are limited to those occurring below a predetermined upper frequency limit.

33. The method of claim 32, wherein:
said predetermined upper frequency limit is 50 Hertz.

34. The method of claim 30, including the steps of:
correlating said intrinsic characteristics of said portions of said current segment of said digital signal with said intrinsic characteristics of said analog signal by re-iterative subtractions; and
wherein lowest differences resulting from said re-iterative subtractions are used for determining correlation.

35. The method of claim 30, whrein:
said predetermined time difference is at least about three seconds.

36. The method of claim 30, wherein:
said predetermined time difference is in the range from about 6 seconds to about 10 seconds.

37. The method of claim 21, wherein said analog signal of the audio message comprises respective signals for enabling the audio message thereof to be reproduced with left (L) and right (R) sound components and whrein said digital signal of the audio message also comprises a plurality of respective signals for enabling the audio message thereof to be reproduced with left (L) and right (R) sound components, said method including the steps of:
adding together characteristics of respective signals of said analog signal for providing a first monaural signal containing audio message information from a plurality of the analog channel signals,
adding together characteristics of respective signals of said digital signal for providing a second monaural signal containing audio message information from a plurality of the digital channel signals; and
correlating intrinsic characteristics of said second monaural signal with intrinsic characteristics of said first monaural signal for synchronizing said digital signal comprising a plurality of channel signals with said analog signal comprising a plurality of channel signals.

38. The method of claim 37, including the steps of:
causing the audio message of said digital signal to be advanced in time relative to the audio message of said analog signal by at least a predetermined time interval,
temporarily storing continuously updated current segments of the respective signals of said digital signal,
said continuously updated current segments having an audio message time length at least equal to the current advance in time of the audio message of said digital signal relative to the audio message of said analog signal,
termporarily storing a continuously updated current segment of said second monaural signal,
said continuously updated current segment of said second monaural signal exactly relating with said continously updated segments of the respective signals of said digital signal,
selectively removing from temporary storage those portions of said continuosly updated segments of the respective channel signals of said digital signal having exactly relating portions of said second monaural signal whose intrinsic characteristics are correlating with the intrinsic characteristics of said first monaural signal, and using the selectively removed portions of said continuously updated segments of the respective signals of said digital signal for providing the digital signal comprising a plurality of respective signals synchronized with said analog signal comprising a plurality of respective signals.

39. The method of claim 37, wherein:
said first monaural signal is a digital signal,
said second monaural signal is a digital signal, and
intrinsic characteristics of said digital second monaural signal are correlated with intrinsic characteristics of said digital first monaural signal.

40. The method of claim 38, wherein:
said first monaural signal is a digital signal,
said second monaural signal is a digital signal, and
intrinsic characteristics of said digital second monaural signal are correlated with intrinsic characteristics of said digital first monaural signal.

41. The method of claim 39, including the step of:
correlating intrinsic characteristics of said digital second monaural signal with intrinsic characteristics of said digital first monaural signal by re-iterative subtraction seeking portions of said digital second monaural signal yielding the lowest differences resulting from re-iterative subtraction, and using those portions of said digital signal comprising a plurality of respective signals exactly corresponding with those portions of said digital second monaural signal yielding the lowest differences for providing the digital signal comprising a plurality of respective signals synchronized with said analog signal comprising a plurality of respective signals.

42. The method of claim 40, including the step of:
correlating intrinsic characteristics of said digital second monaural signal with intrinsic characteristics of said digital first monaural signal by re-iterative subtraction seeking those portions of said digital second monaural signal yielding the lowest differences resulting from re-iterative subtraction.

43. The method of synchronizing a second signal having an audio message at higher quality with a first signal having said audio message at lower quality and wherein said first signal is derived from a master recording, said method being capable of accommodating discontinuities in said first signal and comprising the steps of:

cuasing said second signal to be derived from the master recording, causing the higher quality audio message of the second signal to precede in time the lower quality audio message of the first signal by at least a predetermined interval of time, temporarily storing a continuously updated current segment of the higher quality second audio message, said continuously updated current segment of the higher quality second audio message having a time duration at least equal to the current interval of time by which the higher quality second audio message signal is preceding the lower quality first audio message signal, selectively removing from temporary storage those portions of said higher quality second audio message having intrinsic characteristics correlating with intrinsic characteristics of said lower quality first audio message, and using the selectively removed portions of said higher quality second audio message for providing said second signal having the audio message at higher quality synchronized with the audio message at lower quality of said first signal.

44. The method of claim 43, including the steps of:
deriving a first sequence of indicia indicative of intrinsic characteristics of said lower quality audio message signal, deriving a second sequence of indicia indicative of intrinsic characteristics of said higher quality audio message signal, correlating intrinsic characteristics of said portions of said higher quality second audio message signal with intrinsic characteristics of said lower quality first audio message signal by correlating portions of said second sequence of indicia with said first sequence of indicia, and selectively removing from temporary storage those portions of said higher quality second audio message corresponding with correlated portions of said second sequence of indicia.

45. The method of claim 44, wherein:
said first sequence of indicia is indicative of syllabic structures of said lower quality audio message signal, and said second sequence of indicia is indicative of syllabic structures of said higher quality audio message signal.

46. The method of claim 45, wherein:
said first sequence of indicia is indicative of syllabic structures of an absolute value envelope of said lower quality audio message signal, and said second sequence of indicia is indicative of syllabic structures of an absolute value envelope of said higher quality audio message signal.

47. The method of claim 46, wherein:
said first sequence of indicia is indicative of syllabic structures of an absolute value envelope of said lower quality audio message signal below a predetermined upper frequency limit, and said second sequence of indicia is indicative of syllabic structures of an absolute value envelope of said higher quality audio message below said predetermined upper frequency limit.

48. The method of claim 47, wherein:
said predetermined upper frequency limit is 50 Hertz.

49. the method of claim 44, wherein:
said indicia of said first sequence and said indicia of said second sequence involve magnitude values, said step of correlating portions of said second sequence of indicia with said first sequence of indicia comprise re-iterative subtractions of magnitude values, and wherein lowest differences determine that said portions of said second sequence of indicia are correlating with said first sequence of indicia.

50. The method of claim 49, in which:
said current interval of time is at least about 3 seconds.

51. The method of claim 50, in which:
said current interval of time is in the range from about 6 seconds to about 10 seconds.

52. A system for synchronizing an audio message signal at higher quality with an audio message signal at lower quality, wherein said audio message at lower quality is derived from a master recording said system comprising:

a medium for providing said audio message at higher quality made from the master recording, contorl means for causing said medium to provide the higher quality audio message signal preceding in time the lower quality audio message signal by at least a predetermined interval of time, time-delay means for temporarily storing a continuously updated current segment of the higher quality audio message signal having a time-delay capability at least equal to said predetermined interval of time, said control means including correlating means associated with said time-delay means for selectively removing from said time-delay means those portions of said higher quality audio message signal having intrinsic characteristics correlating with intrinsic characteristics of said lower quality audio message signal for providing said higher quality audio message signal synchronized with said lower quality audio message signal, and whereby said system is capable of accommodating discontinuities in said lower quality audio message signal.

53. The system of claim 52, wherein:
said time-delay means includes a FIFO overwriting memory store.

54. The system of claim 52, wherein:
said time-delay means includes first delay means for temporarily storing said continuously updated current segment of the higher quality audio message signal, and said time-delay means includes a second delay means, said second delay means has a time-delay capability at least equal to the time-delay capability of said first delay means, said second delay means operates synchronously with said first delay means, said system further comprising:

first processor means for deriving a first sequence of indicia indicative of intrinsic characteristics of said lower quality audio message signal, second processor means for deriving a second sequence of indicia indicative of intrinsic characteristics of said higher quality audio message signal, said second delay means being coupled to said second processor means for temporarily storing a continuously updated current segment of said second sequence of indicia relating to the continuously updated current segments of the higher quality audio message temporarily stored in said first delay means, and said correlating means being associated with said second delay means for determining those portions of said second sequence of indicia which are correlated with said first sequence of indicia for causing said control means to remove from said second delay means those portions of the continuously updated temporarily stored current segment of the higher quality audio message relating to said correlated portions of said continuously updated temporarily stored second sequence of indicia.

55. The system of claim 54, wherein:
said first delay means comprises a first FIFO overwriting memory store, and said second delay means comprises a second FIFO overwriting memory store less complex than said first FIFO overwriting memory store.

56. The system of claim 54, further comprising:
selection means for selecting most significant bits of digital words in the higher quality audio message signal, and wherein:

said selection means feeds selected most significant bits of the digital words in the higher quality audio message signal into said second delay means.

57. A system for providing a viewing audience with high quality sound synchronized with viewable images having an ordinart sound signal track associated with said viewable images for providing ordinary sound synchronized with said viewable images, said system comprising:

auxiliary means for providing a high quality signal for providing said high quality sound, control means coupled to said auxiliary means for controlling said auxiliary means, time-delay means coupled to said auxiliary means for temporarily storing a continuously updated current segment of said high quality signal, and said control means including correlating means for correlating portions of said current segment with said ordinary sound signal track for providing a high quality sound signal synchronized with said ordinary sound signal track for providing said high quality sound synchronized with the viewable images, whereby said system maintains synchronization of said high quality sound with said viewable images in spite of discontinuities in said ordinary sound signal track.

58. A system as claimed in claim 57, further comprising:

smooth transition fader means coupled to said time-delay means and coupled to said ordinary sound signal track, said fader means being controlled by said control means for providing ordinary quality sound synchronized with the viewable images during momentary intervals wherein synchronization of the high quality sound is lost due to unusually lengthy discontinuities in said ordinary quality sound signal track, and whereby the viewing audience hears effectively continuous sound appropriately synchronized with the viewable images throughout a presentation thereof.

59. A system as claimed in claim 58, wherein:
said control means causes said auxiliary means to operate at increased speed during such momentary intervals of loss of synchronization of high quality sound for causing said auxiliary means to supply to said time-delay means an appropriately updated current segment of said high quality sound signal.

60. A system as claimed in claim 58, wherein:
said control means causes said auxiliary means normally to operate at a predetermined time advance relative to said ordinary sound signal track, and said control means causes said auxiliary means to reestabish said predetermined time advance when said synchronization of said high quality sound has been momentarily lost.

* * * * *